(12) United States Patent
Mitsuo et al.

(10) Patent No.: US 8,388,021 B2
(45) Date of Patent: Mar. 5, 2013

(54) PASSENGER SEAT AIRBAG APPARATUS (75) Inventors: Tetsu Mitsuo, Nissin (JP); Akiyoshi Sanada, Nishikamo-gun (JP); Naoki Tamura, Yokohama (JP); Hideaki Tanaka, Yokohama (JP)

(73) Assignees: Toyota Jidosha Kabushiki Kaisha, Toyota-shi (JP); Autoliv Development AB, Vargarda (SE)

( * ) Notice: Subject to any disclaimer, the term of this patent is extended or adjusted under 35 U.S.C. 154(b) by 669 days.

(21) Appl. No.: 12/559,548

(22) Filed: Sep. 15, 2009

(65) Prior Publication Data

US 2010/0078924 A1 Apr. 1, 2010

(30) Foreign Application Priority Data

Sep. 29, 2008 (JP) ................................. 2008-251219

(51) Int. Cl.
   *B60R 21/2338* (2011.01)
(52) U.S. Cl. .................................. 280/743.2; 280/728.2
(58) Field of Classification Search ............... 280/728.2, 280/739, 743.1, 734.2, 743.2
   See application file for complete search history.

(56) References Cited

U.S. PATENT DOCUMENTS

| 6,773,030 | B2 * | 8/2004 | Fischer | 280/739 |
| 6,915,974 | B2 * | 7/2005 | Kawasaki | 242/273 |
| 7,017,945 | B2 | 3/2006 | DePottey et al. | |
| 7,318,602 | B2 | 1/2008 | DePottey et al. | |
| 7,413,218 | B2 * | 8/2008 | Ekdahl | 280/739 |
| 7,419,184 | B2 * | 9/2008 | Green et al. | 280/743.2 |
| 7,591,482 | B2 * | 9/2009 | Thomas et al. | 280/739 |
| 7,690,683 | B2 * | 4/2010 | Parks et al. | 280/743.2 |
| 7,753,405 | B2 * | 7/2010 | Ishiguro et al. | 280/739 |
| 7,841,623 | B2 * | 11/2010 | Ito | 280/743.2 |
| 7,938,444 | B2 * | 5/2011 | Williams et al. | 280/743.2 |
| 2004/0130135 | A1 * | 7/2004 | Ekdahl | 280/739 |
| 2006/0192370 | A1 * | 8/2006 | Abe et al. | 280/735 |
| 2007/0194561 | A1 * | 8/2007 | Thomas | 280/728.2 |
| 2009/0302588 | A1 * | 12/2009 | Schramm | 280/743.2 |

FOREIGN PATENT DOCUMENTS

JP 2004155420 A 6/2004

\* cited by examiner

*Primary Examiner* — Joseph Rocca
*Assistant Examiner* — Timothy Wilhelm
(74) *Attorney, Agent, or Firm* — Gifford, Krass, Sprinkle, Anderson & Citkowski, P.C.

(57) ABSTRACT

A passenger seat airbag apparatus includes: an airbag which is housed in a folded state inside an instrument panel, and which inflates toward a passenger with a supply of gas during a frontal collision of a vehicle, and which has a vent hole that can be opened and closed; a tether whose first end is linked to a periphery of the vent hole in the airbag, and which closes the vent hole due to tension that is caused when the airbag inflates; an actuator which has a first hole that a second end of the tether is passed through, and which discontinues a linked state of the tether by cutting the tether if a predetermined condition is satisfied; and a protective member that is attached to the actuator so as to cover at least an edge portion of the first hole, and that is interposed between the edge portion and the tether.

12 Claims, 6 Drawing Sheets

PASSENGER SEAT AIRBAG APPARATUS

INCORPORATION BY REFERENCE

The disclosure of Japanese Patent Application No. 2008-251219 filed on Sep. 29, 2008 including the specification, drawings and abstract is incorporated herein by reference in its entirety.

BACKGROUND OF THE INVENTION

1. Field of the Invention

The invention relates to a passenger seat airbag apparatus.

2. Description of the Related Art

A structure in which a vent hole whose open/closed state is adjustable is provided in a fabric portion of an airbag, in addition to an ordinary vent hole (see Japanese Patent Application Publication No. 2004-155420 (JP-A-2004-155420)). This vent hole is maintained ordinarily in the closed state, and the held closed state is discontinued in response to a signal from a sensor.

In the foregoing related-art technology described in Japanese Patent Application Publication No. 2004-155420 (JP-A-2004-155420), the construction of the clamp is not clearly described. However, for example, a construction can be assumed in which a tether is attached to a tube that forms a vent hole whose open/closed state is adjustable, and the tether is held on an actuator, and if a predetermined condition is satisfied, the tether is cut by operating the actuator to discontinue the holding of the tether and therefore open the vent hole.

However, in the case where a portion of the actuator that holds the tether is constructed of metal, the tether has a direct contact with the metal portion; therefore, it is considered that there is a room for betterment.

SUMMARY OF THE INVENTION

An object of the invention is to provide a passenger seat airbag apparatus in which the tether is substantially prevented from directly contacting a metal portion of the actuator to which the tether is linked, and therefore can be protected.

A passenger seat airbag apparatus in accordance with an aspect of the invention has: an airbag which is housed in a folded state inside an instrument panel that is located in front of a passenger seat, and which inflates toward a passenger sitting in the passenger seat with supply of gas during a frontal collision of a vehicle, and which has a vent hole that can be opened and closed; a tether whose first end is linked to a periphery of the vent hole in the airbag, and which closes the vent hole due to tension that is caused when the airbag inflates; an actuator which has a first hole that a second end of the tether is passed through and that is linked to the tether, and which discontinues a linked state of the tether by cutting the tether if a predetermined condition is satisfied; and a protective member that is attached to the actuator so as to cover at least an edge portion of the first hole, and that is interposed between the edge portion and the tether.

In the passenger seat airbag apparatus of this aspect, the airbag is provided with the vent hole that can be opened and closed, and the vent hole and the actuator are linked by the tether. At the time of a frontal collision of the vehicle, the airbag is supplied with gas and inflates toward a passenger sitting in the passenger seat. If a predetermined condition is satisfied, the actuator is activated to cut the tether linked to the first hole of the actuator, discontinuing the linked state between the tether and the actuator. Therefore, no tension will occur on the tether. Therefore, as the internal pressure of the airbag heightens when the airbag restrains the passenger, the vent hole opens, making it easy for gas to be discharged from inside the airbag. Therefore, the reaction force to the passenger can be reduced.

On the other hand, in the case where the actuator is not activated, tension occurs on the tether, whereby the vent hole is closed. Because the vent hole is closed, it becomes difficult for gas to be discharged from inside the airbag when the inflated airbag restrains the passenger. Thus, an increased reaction force to the passenger can be secured. The resin-made protective member is attached to the actuator so as to cover at least the edge portion of the first hole, and the protective member is interposed between the edge portion of the first hole and the tether. Therefore, even in the case where a portion of the actuator to which the tether is linked is made up of metal, the tether is suppressed from directly contacting the metal portion. Therefore, it is possible to protect the tether.

Besides, in the passenger seat airbag apparatus of the foregoing aspect, the actuator may be in a tubular shape, and the protective member may be a tubular cover.

In the passenger seat airbag apparatus of the foregoing aspect, since the actuator is in a tubular shape and the protective member is a tubular cover, it is easy to attach the protective member to the actuator, and the tether can be protected at low cost.

Besides, the passenger seat airbag apparatus of the foregoing aspect may further include: a module case that houses the airbag; and an attachment bracket for attaching the actuator to the module case, and the protective member may be molded integrally with the attachment bracket.

In this passenger seat airbag apparatus, since the protective member is molded integrally with the attachment bracket of the actuator, the actuator can be stably attached, and the tether can be protected.

Besides, in the passenger seat airbag apparatus of the foregoing aspect, an opening that is smaller than the first hole of the actuator may be formed in the protective member, and the opening of the protective member may be superposed with the first hole when the protective member is attached to the actuator. Furthermore, the opening of the protective member may be a second hole that is smaller in diameter than the first hole, and the second hole and the first hole may be formed so as to become concentric.

In the passenger seat airbag apparatus of the foregoing aspect, the opening that is smaller than the first hole of the actuator is formed in the protective member, and the opening of the protective member is superposed with the first hole when the protective member is attached to the actuator. Besides, the opening of the protective member is a second hole that is smaller in diameter than the first hole, and the second hole and the first hole become concentric. Therefore, the tether passed through the second hole and the first hole does not easily contact the edge portion of the first hole of the actuator although the tether contacts the edge portion of the second hole of the protective member. Because of this, even in the case where the edge portion of the first hole of the actuator is made of metal, the tether is suppressed from directly contacting the metal portion. Therefore, the tether can be further protected.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
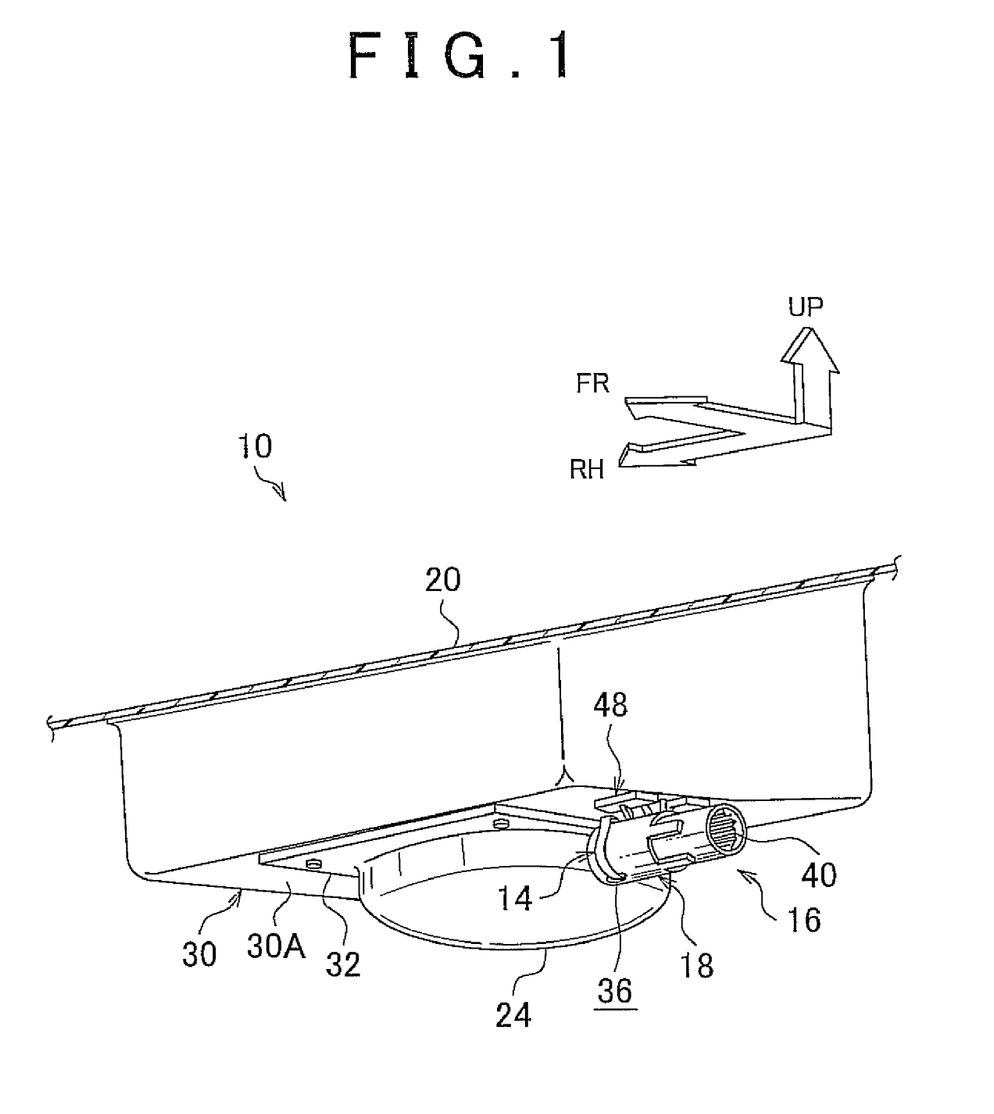
FIG. 1 is a perspective view showing a passenger seat airbag apparatus viewed from inside an instrument panel.

Hereinafter, embodiments of the invention will be described with reference to the drawings. Referring to FIG. 1, a passenger seat airbag apparatus 10 in accordance with an embodiment of the invention has an airbag 12 (FIGS. 4A and 4B), a tether 14, an actuator 16, and a resin-made protective member 18.

Figure 4A:
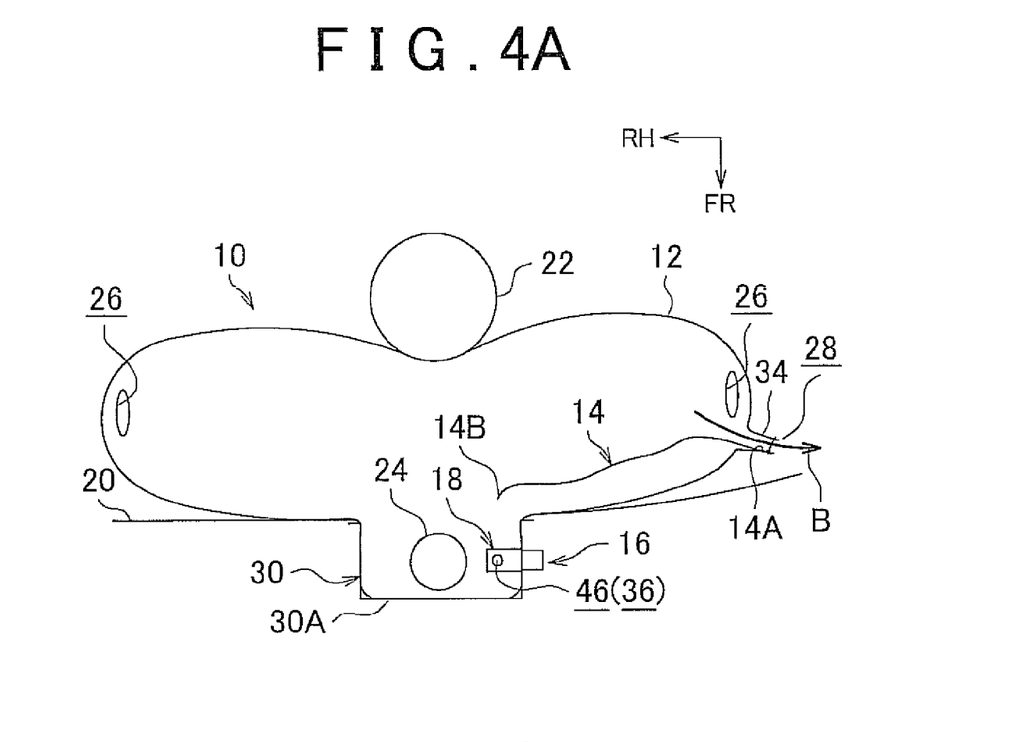
FIG. 4A is a schematic diagram showing a state in which the tether is cut by the actuator, and a vent hole capable of being opened and closed is opened, and a passenger is restrained by an airbag.

The airbag 12 is housed in a folded state inside of an instrument panel 20 in front of a passenger seat (not shown) at an ordinary time. Besides, as shown in FIG. 4A, at the time of a front collision of the vehicle, the airbag 12 is supplied with gas from an inflator 24, and inflates toward a passenger 22 sitting on the frontal collision. Two opposite side portions of the airbag 12, for example, in the vehicle width direction, are provided with a first vent hole 26 of a predetermined size that does not have an open-close function. Each of the two portions has one first bent hole 26. Furthermore, a second vent hole 28 that is capable of being opened and closed is provide in a left-hand-side side portion of the airbag 12 in the width direction of the vehicle.

The airbag 12 and the inflator 24 are housed in the module case 30 at an ordinary time. This module case 30 is disposed on a reverse side of the instrument panel 20.

The inflator 24 is, for example, a disc-shape gas generator that supplies an inflating gas to the airbag 12 at the time of a frontal collision of the vehicle. The flange portion 32 of the inflator 24 is fixed to, for example, a bottom portion of the module case 30. A gas jetting portion (not shown) of the inflator 24 is inserted into the module case 30 through a penetration hole 30B (FIG. 2) that is formed in the bottom portion 30A, and is disposed in the folded airbag 12.

The inflator 24 is connected to an airbag ECU (not shown) via a wire harness (not shown). The inflator 24 is activated by an activation current from the airbag ECU so as to supply the inflating gas to the airbag 12. The airbag ECU causes the activation current to flow to the inflator 24, upon determining that the vehicle has undergone a frontal collision by a signal from a collision sensor (not shown).

Figure 4B:
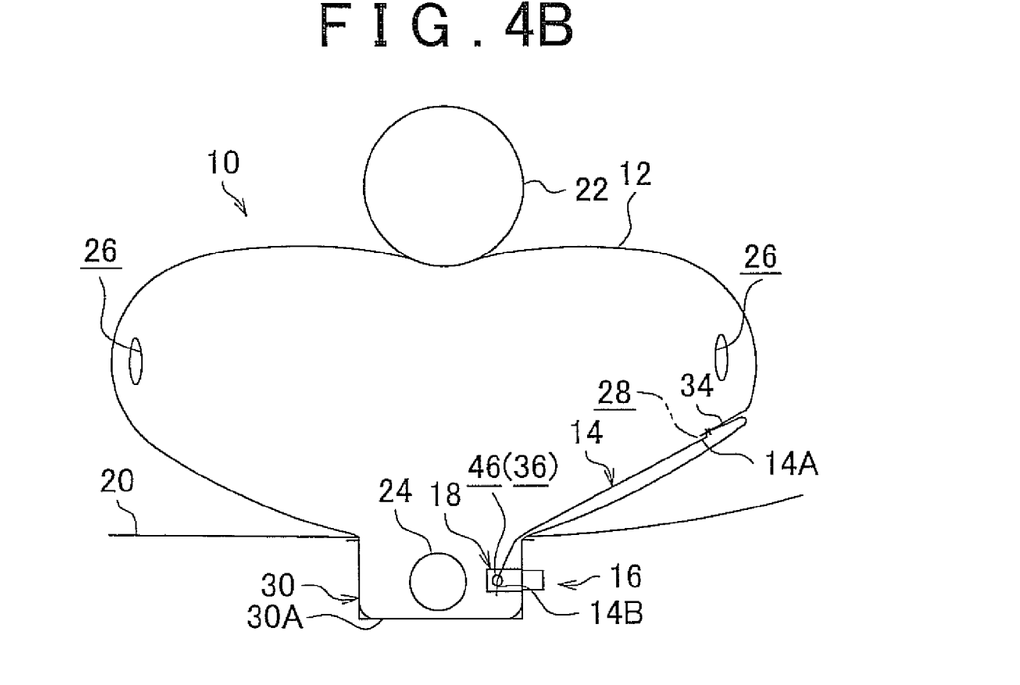
FIG. 4B is a schematic diagram showing a state in which a passenger is restrained by an airbag while the tether is not cut off and the openable and closable vent hole is closed.

In FIG. 4B, a first end 14A of the tether 14 is linked to a perimeter of the second vent hole 28 within the airbag 12. The tether 14 closes the second vent hole 28 due to a tension that is caused when the airbag 12 is inflated and deployed. As shown in FIG. 4A, a duct portion 34 having, for example, a tubular shape, is provided in a side portion of the airbag 12 that is located the left side relative to the vehicle. The second vent hole 28 is formed in the duct portion 34. The duct portion 34 and the second vent hole 28 are provided forward from the first vent hole 26 in the longitudinal direction of the vehicle.

As shown in FIG. 4B, the second vent hole 28 is closed as the duct portion 34 is pulled into the airbag 12 due to the tension of the tether 14. Incidentally, the second vent hole 28 may also be set in a closed state when the airbag 12 is folded and housed within the module case 30.

However, when the linked state of the tether 14 and the actuator 16 is discontinued and the tension of the tether 14 is lost as shown in FIG. 4A, the duct portion 34 is inverted inside out to stick outward on the outside of the airbag 12 (toward the left side of the vehicle in the example shown in FIGS. 4A and 4B) so that the second vent hole 28 opens, since the internal pressure of the airbag 12 heightens as the airbag 12 contacts and restrains the passenger 22.

Figure 2:
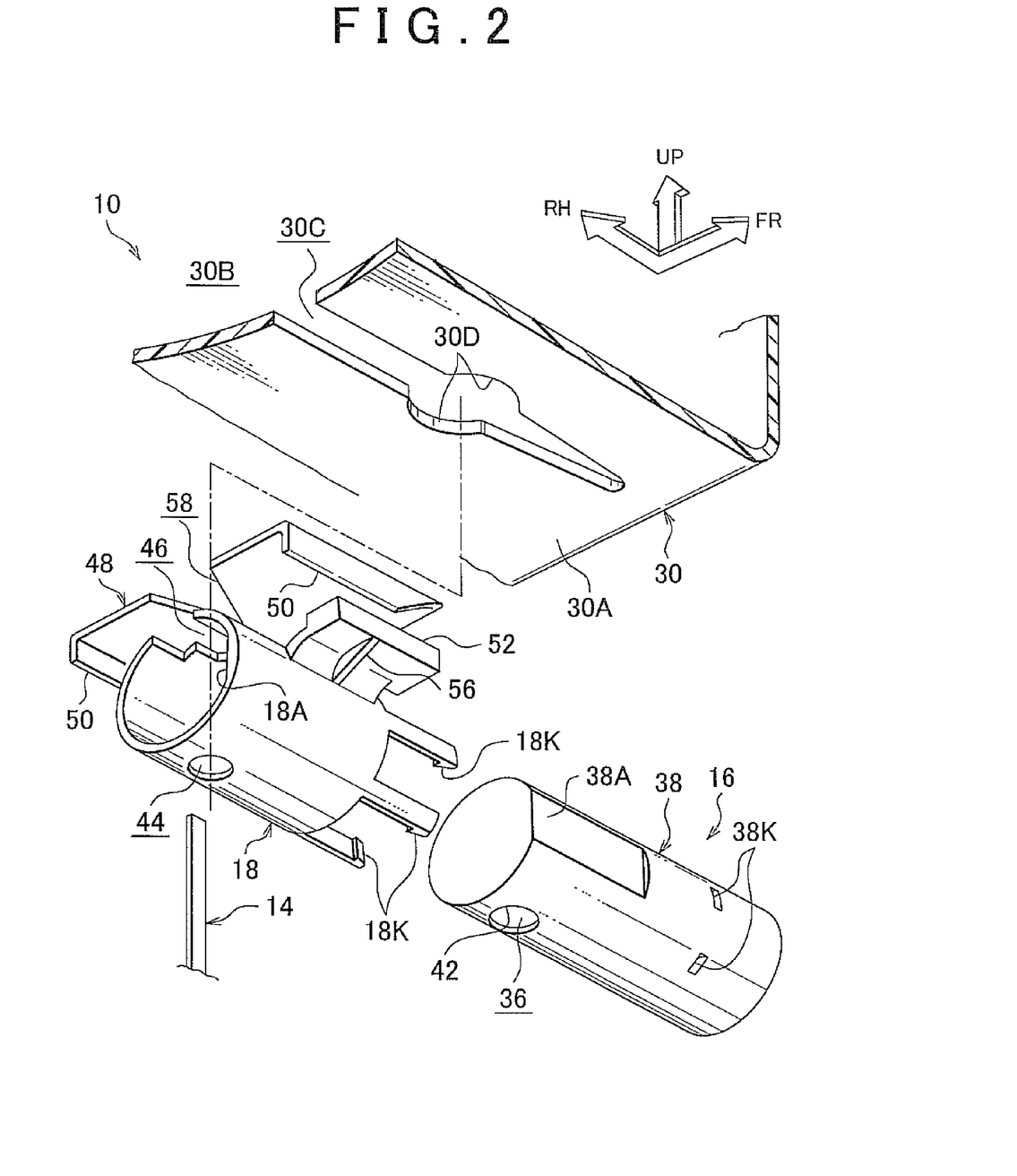
FIG. 2 is an exploded perspective view showing a module case, a protective member, an actuator, and a tether.
Figure 3:
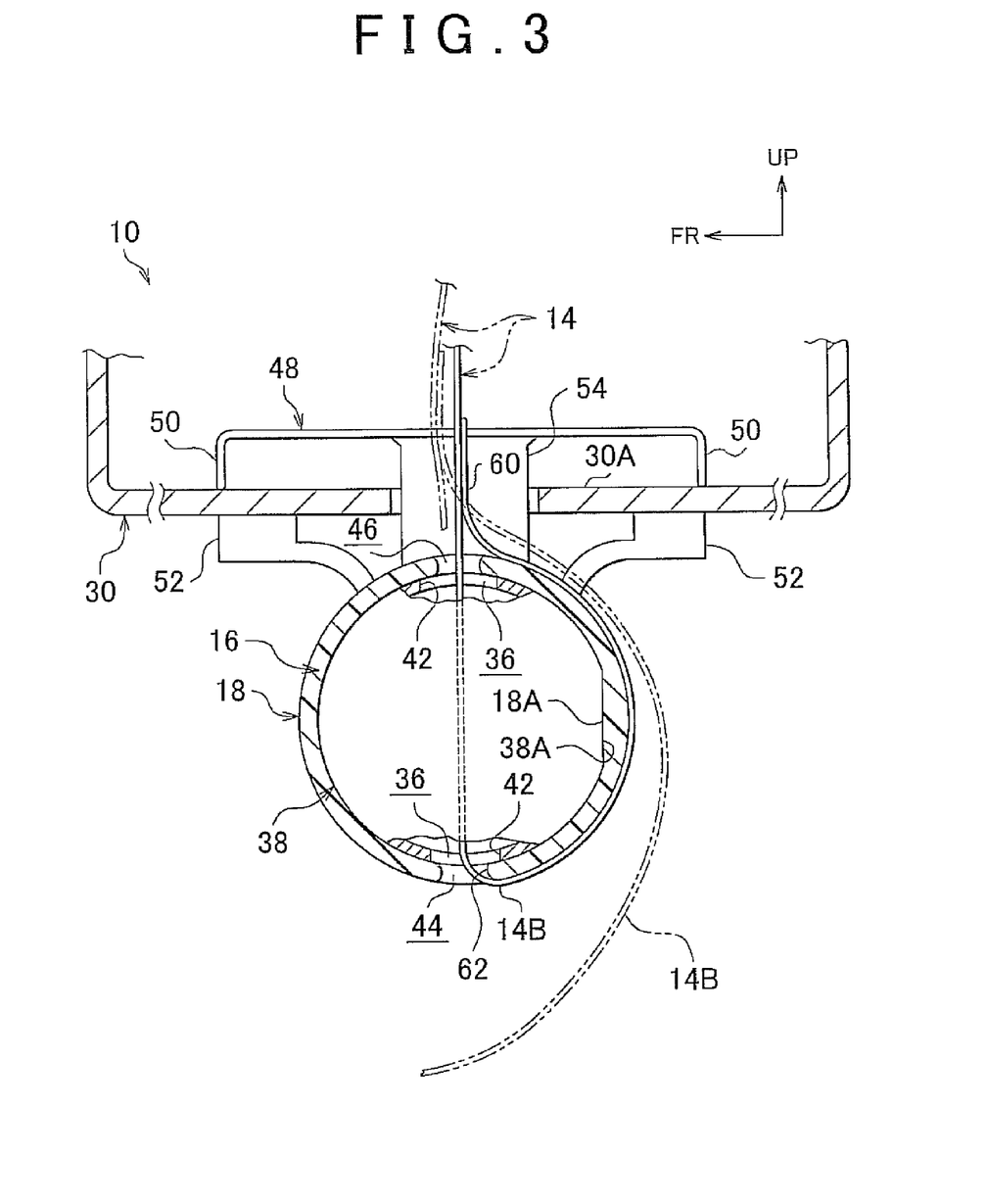
FIG. 3 is an enlarged sectional view showing a linked state and a cut-off state of the tether with respect to the actuator.

As shown in FIGS. 1 to 3, the actuator 16 has first holes 36 that a second end 14B of the tether 14 is passed through and linked to. When a predetermined condition is satisfied, the tether 14 is cut to discontinue the linked state. The actuator 16 has in a casing 38 whose shape is, for example, cylindrical, a gas generator device (not shown) capable of generating a relatively small amount of gas, and a cutter (not shown) that is driven in the axis direction of the casing 38 due to the pressure of the gas generated by the gas generator device. When the cutter passes across the first holes 36, a shearing force is produced on the second end 14B of the tether 14 that is passed through the first holes 36, and thus the second end 14B is cut.

As shown in FIG. 3, the casing 38 is provided with the first holes 36 that penetrate through the casing 38 in a direction of its diameter (e.g., a vertical direction of the vehicle). As shown in FIG. 2, the first holes 36 are provided, for example, in a vehicle-right-hand-side end portion of the casing 38. In a sectional view of the casing 38 of the actuator 16 as shown in FIG. 3, the first hole 36 located in a lower side portion of the casing 38 is provided more remote from the module case 30 than the first hole 36 located in an upper side portion of the casing 38 is from the module case 30. A flat surface 38A extending in the axis direction of the casing 38 is formed at a position in the vehicle-right-hand-side end portion of the casing 39 which is apart from the first hole 36 in the circumferential direction of the casing 38. An outer peripheral surface of the casing 38 that is to the vehicle right hand side of the flat surface 38A is provided with a plurality of recesses 38K that engage with a plurality of hook portions 18K of the protective member 18 when the actuator 16 is attached to the protective member 18.

As shown in FIG. 1, a vehicle-left-hand-side end portion of the actuator 16 is provided with a connection terminal 40 to which a wire harness (not shown) is connected. The actuator 16 is connected to the airbag ECU by the wire harness. The airbag ECU, at the time of a frontal collision of the vehicle, performs such a control as to cause an activating current to flow to the actuator 16 via the wire harness, for example, if the passenger 22 is wearing a seatbelt (not shown), as shown in FIG. 4A. The actuator 16 is activated by the activation current from the airbag ECU so as to generate a relatively small amount of gas within the casing 38. The pressure of the gas drives the cutter to cut off the tether 14.

Whether or not the passenger 22 is wearing the seatbelt is determined on the basis of a signal from a buckle switch that is provided in a buckle device (not shown) of the seatbelt.

Concretely, when a tongue plate (not shown) of the seatbelt is properly inserted in the buckle device, the buckle switch is on, so that it is determined that the passenger 22 is wearing the seatbelt. When the tongue plate is not inserted in the buckle device, the buckle switch is off, so that it is determined that the passenger 22 is not wearing the seatbelt.

In the case where the passenger 22 sitting on the passenger seat is wearing the seatbelt, the inertial force of the passenger 22 can be borne to a certain extent by the seatbelt; therefore, in order to reduce the reaction force of the airbag 12 to the passenger 22, the actuator 16 is activated to cut the tether 14 and therefore release or open the second vent hole 28. On the other hand, in the case where the passenger 22 is not wearing the seatbelt, for example, in a country or region where it is not required that the passenger in the passenger seat wear the seatbelt, the actuator 16 is not activated, so that the second vent hole 28 remains closed.

Incidentally, the criterion for the determination as to whether or not to activate the actuator 16 is not limited to a signal regarding whether or not the passenger is wearing the seatbelt. For example, the criterion may be whether or not the passenger 22 sitting in the passenger seat is close to the instrument panel 20. The sitting position of the passenger 22 can be determined by a signal from a passenger's sitting position detector (not shown). An example of the passenger's sitting position detector to be used herein is a seat stride sensor that detects the position of the passenger seat in the front-rear direction.

In this manner, the criterion for the determination as to whether to activate the actuator 16 may be arbitrarily set.

In FIGS. 1 to 3, the resin-made protective member 18 is a cylindrical cover fitted to the cylindrical actuator 16, and is attached to the actuator 16 so as to cover edge portion 42 of each of the first holes 36, and is interposed between the edge portions 42 and the tether 14. Concretely, a vehicle-right-hand-side end portion of the protective member 18 has a second hole 44 that is smaller in diameter than the first holes 36 of the actuator 16, and that becomes concentric with the first holes 36 when the protective member 18 is attached to the actuator 16. In the example shown in FIG. 1, the position of the second hole 44 coincides with the position of the lower-side first hole 36.

The protective member 18, at a position corresponding to the upper-side first hole 36, is provided with, for example, a cutout 46 that are superposed on the upper-side first hole 36. As shown in FIG. 3, the width of the cutout 46 is set smaller than the diameter of the upper-side first hole 36. For protection of the tether 14, the edge portions of the second hole 44 and the cutout 46 are each chamfered.

The inner surface of the protective member 18 has a flat surface portion 18A that is superposed on the flat surface portion 38A of the casing 38 of the actuator 16. By attaching the actuator 16 to the protective member 18 so that the flat surface portions 38A and 18A thereof coincide with each other, the positioning of the lower first hole 36 and the second hole 44 and the positioning of the upper first hole 36 and the cutout 46 can be achieved, and rotation of the actuator 16 relative to the protective member 18 can be restrained. That is, the flat surface portion 38A of the casing 38 and the flat surface portion 18A of the protective member 18 have a function as position defining portions that define the position of the actuator 16 to the protective member 18 in the circumferential direction.

A vehicle-left-hand-side end portion of the protective member 18 is provided with a plurality of hook portions 18K that are engageable with the recesses 38K of the casing 38 of the actuator 16. Since the hook portions 18K and the recesses 38K are engaged when the actuator 16 is attached to the protective member 18, the actuator 16 can be stably held by the protective member 18. In addition, the vehicle-right-hand-side end portion of the protective member 18 may also be provided with a stopper that contacts the vehicle-right-hand-side end portion of the actuator 16 when the actuator 16 is attached to the protective member 18. This stopper can easily be realized, for example, by closing partially or entirely a vehicle-right-hand-side opening portion of the protective member 18.

The protective member 18 is molded integrally with an attachment bracket 48 of the actuator 16. As shown in FIG. 3, the attachment bracket 48 has an upper-side guide portion 50 (inner-side guide portion) and a lower-side guide portion 52 (outer-side guide portion) that extend in the axis direction of the protective member 18. The attachment bracket 48 is constructed to be attached to the module case 30 in such a manner that the bottom portion 30A of the module case 30 is fitted into a space between the upper-side guide portion 50 and the lower-side guide portion 52. When the attachment bracket 48 is attached to the module case 30, the upper-side guide portion 50 is located on the inside of the module case 30, and the lower-side guide portion 52 is located on the outside of the module case 30. That is, the bottom portion 30A of the module case 30 is sandwiched between the upper-side guide portion 50 and the lower-side guide portion 52.

The upper-side guide portion 50 and an upper portion of an outer peripheral surface of the protective member 18 are interlinked by, for example, a leg portion 54. The lower-side guide portion 52 is linked to the outer peripheral surface of the protective member 18, and is reinforced by a rib 56. The space in the vehicle vertical direction between the upper-side guide portion 50 and the lower-side guide portion 52 is set slightly smaller than the plate thickness of the bottom portion 30A of the module case 30. When the attachment bracket 48 is attached to the bottom portion 30A, at least one of the upper-side guide portion 50 and the lower-side guide portion 52 elastically deforms, and the elastic force forces the bottom portion 30A to fit between the upper-side guide portion 50 and the lower-side guide portion 52.

As shown in FIG. 2, a slit 30C that extends in the vehicle width direction, and that which the leg portion 54 of the attachment bracket 48 is passed through is formed in the bottom portion 30A of the module case 30. A vehicle-right-hand-side end portion of the slit 30C is connected to or open to penetration hole 30B that is provided for the inflator 24 (FIG. 1), and a vehicle-left-hand-side end portion of the slit 30C terminates within the bottom portion 30A. The width of the slit 30C at the opening side of the penetration hole 30B is set larger than the width of the leg portion 54 of the attachment bracket 48. Besides, the width of the slit 30C is set so as to, for example, gradually decrease in accordance with the position of the width is moved from the opening side to the terminal end side (from the vehicle right hand side to the vehicle left hand side). Therefore, as the leg portion 54 of the attachment bracket 48 is slid through the slit 30C to the vehicle left hand side in the process of attaching the protective member 18 to the module case 30, the leg portion 54 contacts an end surface of the slit 30C and the friction force therebetween increases, so that the leg portion 54 is appropriately fitted in the slit 30C.

In order to facilitate the positioning of the protective member 18 relative to the module case 30, it is also permissible to provide a construction in which the attachment bracket 48 and the bottom portion 30A are engaged with each other in a clicking action.

As for the slit 30C, the width of the slit 30C is partially expanded at a position that is superposed with the second hole 44 or the cutout 46 of the protective member 18, that is, at which the tether 14 is passed through. Concretely, the edge surface of the slit 30C is provided with, for example, arc-shape recess portions 30D that form an opening through which the tether 14 is passed. Likewise, in the upper-side guide portion 50 of the attachment bracket 48, for example, a V-shape cutout 58 through which the tether 14 is passed is formed at a position where the tether 14 is passed. The opening size of the recess portions 30D provided in the module case 30, and the opening size of the cutout 58 provided in the upper-side guide portion 50 are sufficiently larger than the opening size of the cutout 46 of the protective member 18. A reason for this is to restrain the tether 14 from contacting the edge portions of the recess portions 30D provided in the module case 30 or the edge portion of the cutout 58 provided in the upper-side guide portion 50.

As shown by solid lines in FIG. 3, the second end 14B of the tether 14 is linked to the actuator 16 to which the protective member 18 has been attached. Concretely, the second end 14B of the tether 14 is passed through the cutout 46 of the protective member 18, the upper-side first hole 36 of the actuator 16, and the lower-side first hole 36 of the actuator 16, and the second hole 44 of the protective member 18, and then is folded back, for example, to a rear side, and is sewed on the tether 14 itself in a connecting portion 60 above the cutout 46. The second end 14B is cut off as shown by dashed two-dotted lines, when the actuator 16 is activated.

Figure 5:
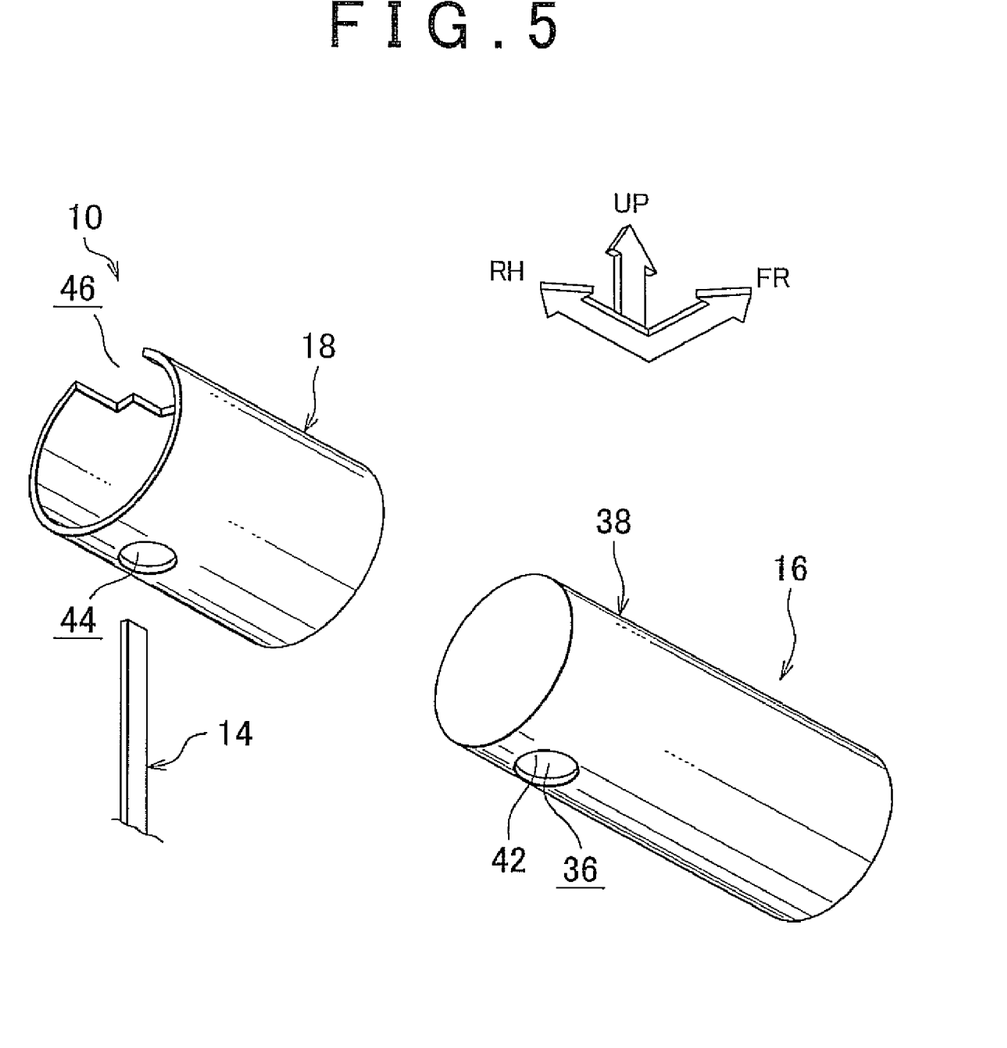
FIG. 5 is an exploded perspective view showing a protective member, an actuator, and a tether in accordance with a modification in which the protective member has a hollow cylindrical shape without an attachment bracket.
Figure 6:
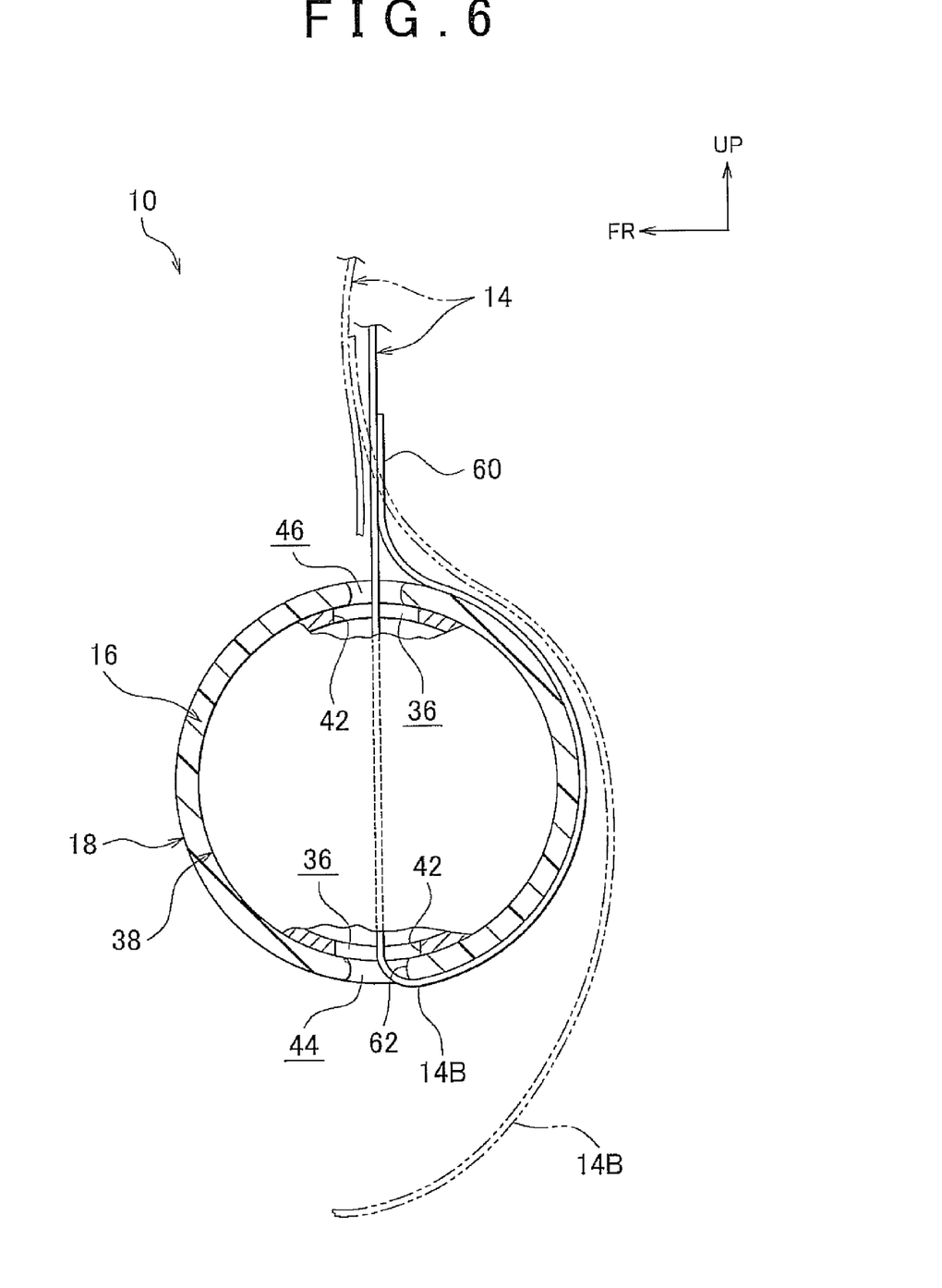
FIG. 6 is an enlarged sectional view showing a linked state and a cut-off state of the tether with respect to the actuator in accordance with a modification in which the protective member has a hollow cylindrical shape without an attachment bracket.

As shown in FIGS. 5 and 6, the protective member 18 is not restricted to a member that is molded integrally with the attachment bracket 48 (FIG. 2), but may also be a merely cylindrical cover that is provided separately from the attachment bracket 48. In this manner, the tether 14 can be protected at reduced cost if the protective member 18 is provided in a simple shape separately from the attachment bracket 48. In this case, a member for attaching the actuator 16 to the module case 30 (FIG. 2) is used.

Operation of this embodiment will be described. As shown in FIG. 4B, in the passenger seat airbag apparatus 10 in accordance with the embodiment, when the vehicle undergoes a frontal collision and the airbag ECU determines the occurrence of the collision on the basis of a signal from a collision sensor (not shown), an activation current is caused to flow from the airbag ECU to the inflator 24. Upon receiving the activation current, the inflator 24 activates to jet a large amount of gas. As the gas is supplied into the airbag 12, the airbag 12 inflates toward the passenger 22 that is sitting in the passenger seat.

If it is determined that the passenger 22 is wearing the seatbelt (not shown) as shown in FIG. 4A, an activation current is caused to the actuator 16 as well, simultaneously with the activation current to the inflator 24. Then, in the casing 38 of the actuator 16, a relatively small amount of gas is generated, and the pressure of the gas drives the cutter in the casing 38 in the axis direction of the casing 38 to move across the first hole 36. At this time, due to the shearing force produced between the edge portion 42 of the first hole 36 and the cutter, the tether 14 passed through the first holes 36 is cut off, discontinuing the linked state between the tether 14 and the actuator 16. Then, since the tension of the tether 14 is lost, the duct portion 34 is inverted inside out to stick out on the outside of the airbag 12 (the vehicle left hand side in the example shown in FIG. 4A), thus opening the second vent hole 28, as the internal pressure of the airbag 12 heightens when the airbag 12 restrains the passenger 22. This makes it easy for the gas to be discharged from inside the airbag 12 in the direction of an arrow B, so that the reaction force of the airbag 12 to the passenger 22 can be reduced. In the case where the passenger 22 is wearing the seatbelt, it is desirable to reduce the reaction force of the airbag 12 to the passenger 22 since the seatbelt bears the inertial force of the passenger 22 to some extent.

On the other hand, in the case where it is determined that the passenger 22 is not wearing the seatbelt, the activation current is not caused to flow from the airbag ECU to the actuator 16, and therefore the actuator 16 is not activated. Therefore, as shown in FIG. 4B, as the airbag 12 inflates, tension occurs on the tether 14, so that the duct portion 34 linked to the first end 14A of the tether 14 is pulled into the airbag 12, and thus the second vent hole 28 is closed. This makes it hard for gas to be discharged from the second vent hole 28, so that the reaction force of the airbag 12 to the passenger 22 can be made larger. In the case where the passenger 22 is not wearing the seatbelt, it is desirable that the reaction force of the airbag 12 to the passenger 22 be made larger, since the airbag 12 is to bear the inertial force of the passenger 22.

Incidentally, the airbag 12 is provided not only the second vent hole 28 that is openable and closable, but also with the first vent holes 26 of a predetermined size. Therefore, when the airbag 12 restrains the passenger 22, the gas is discharged from the first vent hole 26, regardless of whether or not the openable-closable second vent hole 28 is opened.

Herein, the resin-made protective member 18 is attached to the actuator 16 so as to cover at least the edge portion 42 of the first hole 36, the protective member 18 is interposed between the edge portions 42 of the first holes 36 and the tether 14. Therefore, even in the case where the portion of the actuator 16 to which the tether 14 is linked is made up of metal, the tether 14 is suppressed from directly contacting the metal portion.

Concretely, as shown in FIG. 3, the protective member 18 is provided with the second hole 44 that is smaller in diameter than in the first holes 36 of the actuator 16 and that becomes concentric with the first holes 36 when the protective member 18 is attached to the actuator 16. Therefore, the tether 14 passed through the second hole 44 and the first holes 36 contacts the edge portion 62 of the second hole 44 of the protective member 18, but does not easily contact the edge portions 42 of the first holes 36. That is, the tether 14 passed through the second hole 44 and the first hole 36 contacts only the edge portion 62 of the second hole 44 of the protective member 18. Therefore, even in the case where the edge portions 42 of the first holes 36 of the actuator 16 are made of metal, the tether 14 is restrained from directly contacting the metal portions. Because of this, even in the case where the actuator 16 is not activated, that is, where tension occurs on the tether 14, the linked state between the tether 14 and the actuator 16 can be stably maintained.

In the passenger seat airbag apparatus 10 in accordance with the embodiment, the actuator 16 is provided in a cylindrical shape, and the protective member 18 is a cylindrical cover that is fitted to the actuator 16. Therefore, it is easy to attach the actuator 16 to the protective member 18, and the tether 14 can be protected at low cost. In addition, since the protective member 18 is formed integrally with the attachment bracket 48 of the actuator 16, the actuator 16 can be stably attached to the module case 30.

Incidentally, the invention does not need to be limited to the foregoing embodiment, but may have any structure as long as the structure achieves the effect of the invention. For example, although the number of the openable-closable second vent hole 28 shown in the drawings is one, this is not restrictive, but the number thereof may also be two or more. Besides, although in the foregoing embodiment, the second hole 44 of the protective member 18 is concentric with the first holes 36, this is not restrictive. It suffices that the airbag apparatus of this invention have a construction in which the edge portion 62 of the second hole 44 is interposed between the edge portions 42 of the first holes 36 and the tether 14 and the direct contact between the edge portions 42 of the first holes 36 and the tether 14 can be restrained.

What is claimed is:

1. A passenger seat airbag apparatus comprising:
   an airbag which is housed in a folded state inside an instrument panel that is located in front of a passenger seat, and which inflates toward a passenger sitting in the passenger seat with a supply of gas during a frontal collision of a vehicle, and which has a vent hole that can be opened and closed;
   a tether whose first end is linked to a periphery of the vent hole in the airbag, and which closes the vent hole due to tension that is caused when the airbag inflates;
   a casing of an actuator which has a first hole that a second end of the tether is passed through and that is linked to the tether, and which discontinues a linked state of the tether by cutting the tether if a predetermined condition is satisfied;
   a protective member that is attached to the casing of the actuator so as to cover at least an edge portion of the first hole, and that is interposed between the edge portion and the tether;
   an opening that is smaller than the first hole of the casing of the actuator is formed in the protective member;
   the opening of the protective member is superposed with the first hole when the protective member is attached to the actuator;
   the casing of the actuator has at least two first holes, the actuator is in a cylindrical shape;
   the protective member has at least two openings, the protective member is a cylindrical cover;
   one of the first holes is superposed with one of the openings of the protective members, and the other of the first holes is superposed with the other of the openings of the protective member; and
   the two first holes of the casing of the actuator are each provided in a diameter direction of the actuator, the two openings of the protective member are each provided in a diameter direction of the cover.

2. The passenger seat airbag apparatus according to claim 1, wherein
   the actuator is in a tubular shape, and
   the protective member is a tubular cover.

3. The passenger seat airbag apparatus according to claim 2, wherein
   the actuator is in a cylindrical shape, and
   the tubular cover is in a cylindrical shape.

4. The passenger seat airbag apparatus according to claim 1, further comprising:
   a module case that houses the airbag; and
   an attachment bracket for attaching the actuator to the module case,
   wherein the protective member is molded integrally with the attachment bracket.

5. The passenger seat airbag apparatus according to claim 1, wherein
   the opening of the protective member is a second hole that is smaller in diameter than the first hole.

6. The passenger seat airbag apparatus according to claim 5, wherein
   the second hole and the first hole are concentric when the second hole and the first hole are superposed on each other.

7. The passenger seat airbag apparatus according to claim 5, wherein
   the tether contacts only the edge portion of the second hole in a state where the tether has been passed through the first hole of the actuator and the second hole of the protective member.

8. The passenger seat airbag apparatus according to claim 1, wherein
   the opening of the protective member is a cutout whose opening size is smaller than a diameter of the first hole.

9. The passenger seat airbag apparatus according to claim 1, wherein
   the edge portion of the opening of the protective member is chamfered.

10. The passenger seat airbag apparatus according to claim 1, further comprising
    a module case that houses the airbag,
    wherein the module case is provided with an opening through which the tether is passed, and a size of the opening of the module case is larger than a size of the opening of the protective member.

11. The passenger seat airbag apparatus according to claim 1, further comprising:
    a module case that houses the airbag; and
    an attachment bracket for attaching the actuator to the module case,
    wherein when the attachment bracket is attached to the module case, the attachment bracket includes an inside guide portion that is located on an inside of the module case, and an outside guide portion that is located on an outside of the module case, and wherein the module case is sandwiched between the inside guide portion and the outside guide portion.

12. The passenger seat airbag apparatus according to claim 11, wherein
    the inside guide portion is provided with an opening through which the tether is passed, and a size of the opening of the inside guide portion is larger than a size of the opening of the protective member.

* * * * *